(12) United States Patent
Granucci et al.

(10) Patent No.: US 8,517,279 B2
(45) Date of Patent: Aug. 27, 2013

(54) REAL-TIME CARD BALANCE ON CARD PLASTIC

(75) Inventors: Nicole Janine Granucci, San Francisco, CA (US); Carrie Elaine Vriheas, San Francisco, CA (US); Ayman A. Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 13/493,842

(22) Filed: Jun. 11, 2012

(65) Prior Publication Data

US 2013/0024305 A1   Jan. 24, 2013

Related U.S. Application Data

(63) Continuation of application No. 11/904,335, filed on Sep. 26, 2007, now Pat. No. 8,215,560.

(51) Int. Cl.
*G06K 19/06* (2006.01)
*G06K 5/00* (2006.01)
*G06Q 40/00* (2012.01)
*G06Q 20/00* (2012.01)
*G07D 11/00* (2006.01)
*G07F 19/00* (2006.01)

(52) U.S. Cl.
USPC ........... 235/492; 235/493; 235/379; 235/380; 705/41; 705/17

(58) Field of Classification Search
USPC ................ 235/492, 379, 380, 487; 705/16, 705/17, 39, 41, 44; 340/5.8, 5.81, 5.85, 5.4, 340/5.41, 5.42, 5.51, 5.54, 5.6, 5.61, 5.62, 340/5.64, 5.65, 5.66; 455/556.1, 558
See application file for complete search history.

(56) References Cited

U.S. PATENT DOCUMENTS

| | | | | |
|---|---|---|---|---|
| 4,044,231 A | * | 8/1977 | Beck et al. | 235/488 |
| 4,701,601 A | * | 10/1987 | Francini et al. | 235/449 |
| 4,764,666 A | * | 8/1988 | Bergeron | 463/25 |
| 4,868,376 A | * | 9/1989 | Lessin et al. | 235/492 |
| 5,034,597 A | * | 7/1991 | Atsumi et al. | 235/380 |
| 5,521,363 A | * | 5/1996 | Tannenbaum | 235/379 |

(Continued)

FOREIGN PATENT DOCUMENTS

| | | |
|---|---|---|
| GB | 2291237 A | 1/1996 |
| KR | 20030071945 A | 9/2003 |
| SE | 9 804 466 A | 6/2000 |

OTHER PUBLICATIONS

Examiner's First Report for Australian Application No. 2008304653. Dated Jun. 18, 2012, 4 pages.

(Continued)

*Primary Examiner* — Michael G Lee
*Assistant Examiner* — Suezu Ellis
(74) *Attorney, Agent, or Firm* — Kilpatrick Townsend & Stockton

(57) ABSTRACT

A system, method and prepaid payment card configured to display a current card balance on the prepaid payment card. The prepaid payment card receives a balance request from a button on the card. After retrieving the current card balance encoded on the prepaid payment card, the card displays the current card balance. Remote terminals may be configured to support the real-time display of a balance on a prepaid payment card by writing the current balance to the card after a payment transaction has occurred.

20 Claims, 8 Drawing Sheets

(56) References Cited

U.S. PATENT DOCUMENTS

| | | | |
|---|---|---|---|
| 5,777,903 A | 7/1998 | Piosenka | |
| 5,828,044 A * | 10/1998 | Jun et al. | 235/380 |
| 7,024,395 B1 * | 4/2006 | McCown et al. | 705/65 |
| 7,440,771 B2 * | 10/2008 | Purk | 455/556.1 |
| 7,503,504 B2 * | 3/2009 | Mitra | 235/492 |
| 7,628,319 B2 * | 12/2009 | Brown et al. | 235/375 |
| 7,975,927 B1 * | 7/2011 | Whitney | 235/492 |
| 8,215,560 B2 * | 7/2012 | Granucci et al. | 235/492 |
| 8,308,059 B2 * | 11/2012 | Granucci et al. | 235/380 |
| 2004/0171406 A1 | 9/2004 | Purk | |
| 2005/0065884 A1 | 3/2005 | Capurso et al. | |
| 2008/0086417 A1 * | 4/2008 | Bykov et al. | 705/40 |
| 2012/0066126 A1 * | 3/2012 | Kingston et al. | 705/44 |

OTHER PUBLICATIONS

European Office Action for European Patent Application No. 08833408.1 based on PCT/US2008/076761. Dated Aug. 8, 2012. 8 pages.

Hayness G: "ISO Moves to Improve Magnetic Stripe Cards," ID Systems, Helmers Publishing, US, vol. 4, No. 7, Sep. 1, 1996, XP000736998, ISSN: 1081-275X.

European Summons mailed Apr. 26, 2013 in European Application No. 08833408.1.

* cited by examiner

REAL-TIME CARD BALANCE ON CARD PLASTIC

This application is a continuation of U.S. patent application Ser. No. 11/904,335, filed Sep. 26, 2007, issued as U.S. Pat. No. 8,215,560, titled "Real-Time Card Balance on Card Plastic." The disclosures of which are hereby incorporated by reference in their entirety for all purposes.

BACKGROUND

1. Field of the Invention

Aspects of the present invention relate in general to financial services. Aspects include a prepaid payment card apparatus, system, method and computer-readable medium to display a real-time prepaid payment card balance. Further aspects of the invention include a method of storing and displaying a real-time prepaid payment card balance.

2. Description of the Related Art

The traditional paper "gift-certificate" is gradually being replaced by prepaid payment cards—debit cards with a set limited value associated with a Primary Account Number (PAN). Some cards may be affiliated with a particular vendor, such as a department store, supermarket or restaurant; yet other cards may be affiliated with an acquirer, payment processor, or other issuer. Prepaid payment cards may be distributed with any dollar amount, and some prepaid cards may be replenished with additional funds.

When a consumer cardholder makes a purchase, the prepaid payment card may be used to pay for the transaction. If the purchase amount equals or exceeds the value of the prepaid payment card, the customer simply pays the excess amount using cash, credit card, or other financial instrument accepted by the vendor. However, when the purchase amount is less than the value of the prepaid payment card, the purchase price is simply subtracted from the prepaid payment card value, and a new balance remains associated with the card.

Cardholders who carry prepaid payment cards are often unaware of the balance of a prepaid payment card, especially on non-reloadable card products. While some issuer and acquirers mandate support for balance inquiries for some gift cards and incentive cards, such support is optional at merchants.

When issuers fail to support these enhancements, or when merchants do not support them, cardholders are restricted to spending the amount that is available on the card within one transaction often without knowing the balance in advance.

When issuers, acquirers, and processors do not support these enhancements at the point-of-sale, the consumer is inconvenienced, and the process breaks down. Consumer frustration is common, resulting in higher amounts of breakage (resulting in unrecognized sales volume), and alternate forms of payment being used. Worse, consumers are discouraged from purchasing more prepaid payment cards.

In the re-loadable prepaid card category, the only way a consumer can determine their card balance is by calling their card issuer/third party agent or looking up the information online.

SUMMARY

Embodiments of the invention include a system, method and prepaid payment card configured to display a current card balance on the prepaid payment card. A remarkable aspect of the invention is that a card balance retrieved from the card issuer and stored at the prepaid payment card, as generally no card balance information is ever stored on prepaid payment cards. The prepaid payment card receives a balance request from a button on the card. After retrieving the current card balance encoded on the prepaid payment card, the card displays the current card balance.

DETAILED DESCRIPTION

One aspect of the present invention includes the realization that displaying a real-time balance on a prepaid payment card reduces the cost of issuers supporting balance inquiry and balance returns from consumer cardholders. With the card balance display solution, re-loadable card holders would be able to check their balance at any time, generating a higher volume of unplanned purchases, and potentially a higher amount of re-loads at the point of sale.

Embodiments of the present invention include a card apparatus, system, method, and computer-readable medium configured to support the real-time display of a balance on a prepaid payment card. Other embodiments of the present invention may include remote terminals configured to support the real-time display of a balance on a prepaid payment card.

Figure 1A:
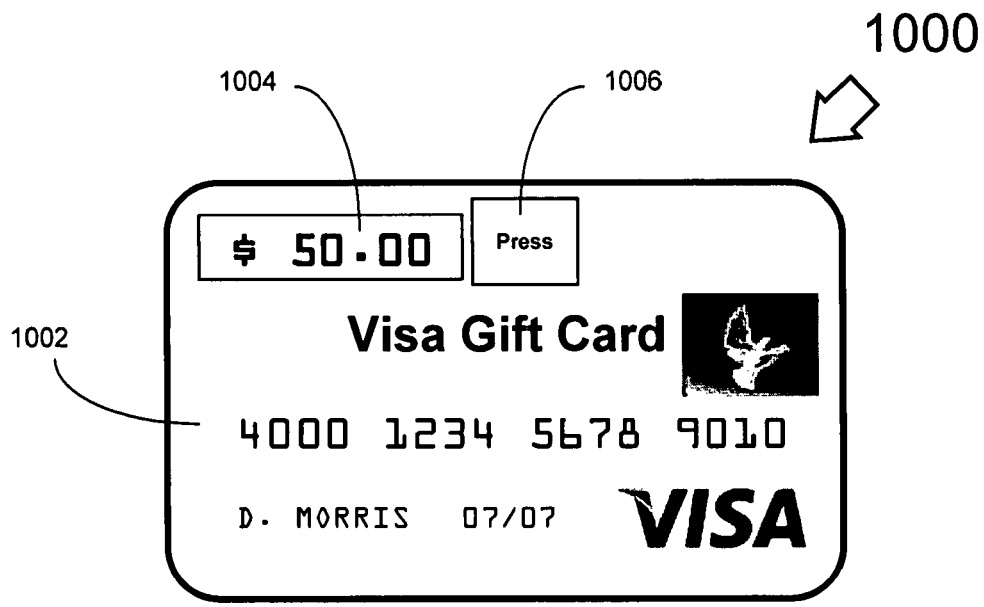
FIGS. 1A-B illustrate an embodiment of a non-reloadable prepaid payment card configured to display the current balance of the card.
Figure 1B:
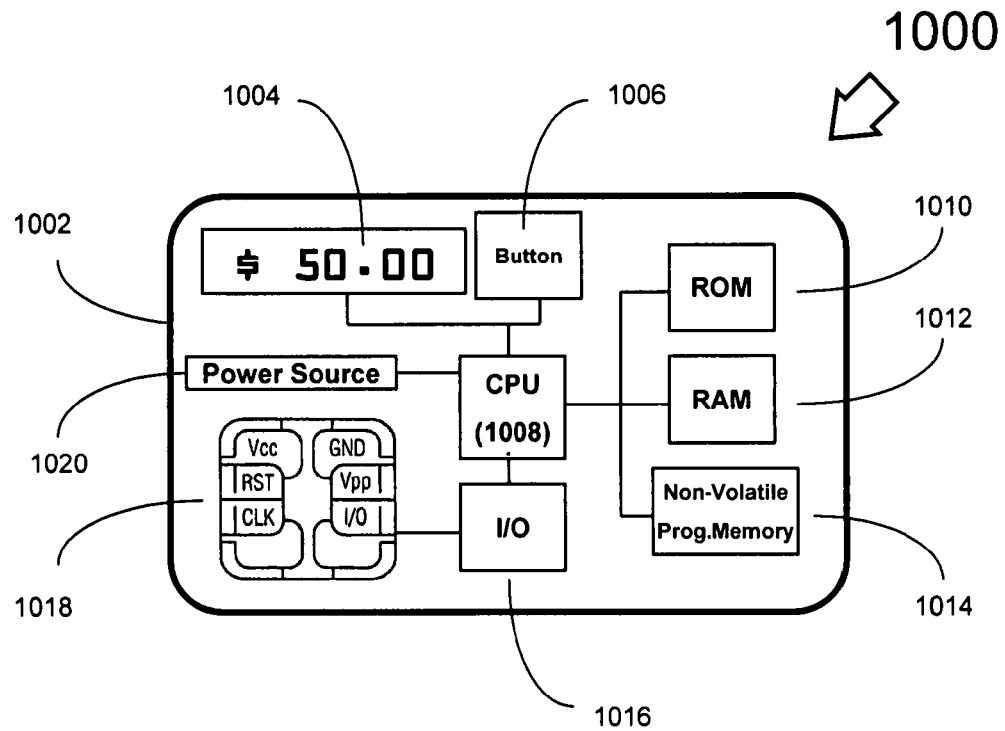

Turning to FIGS. 1A-B, these figures depict a prepayment card 1000 configured to display of a balance on a real-time balance, constructed and operative in accordance with an embodiment of the present invention. In this example, prepayment card 1000 is assumed to be a non-reloadable embodiment, but it is understood that some embodiments may be reloadable.

As shown in FIG. 1A, the payment card 1000 includes a plastic support 1002, a display 1004, and a button 1006. It is understood that plastic support 1002 may further contain a stamped imprint of a primary account number a customer name, expiration date, and various security measures such as a hologram or signature panel. Some embodiments of plastic support 1002 also have a magnetic stripe containing the personal account number and the expiration date.

Display 1004 may be a liquid crystal display (LCD), light-emitting-diode (LED), organic light-emitting-diode (OLED), surface-conduction electron-emitter display (SED), digital light processing (DLP), interferometric modulator display (IMOD) or any other display known in the art that can be used within the form factor required by the payment card 1000.

Button 1006 may be any sensor button known in the art. It is understood by those familiar in the art that one or more buttons may be implemented.

Internal components of payment card 1000 are shown in FIG. 1B. Embedded within plastic support 1002, a processor or central processing unit 1008 is electrically coupled to the display 1004, button 1006, Read-Only-Memory (ROM) 1010, Random Access Memory (RAM) 1012, a non-volatile programmable memory 1014, input/output circuitry 1016, and power supply 1020. It is understood by those familiar with the art that some or all of these elements may be embedded together in some combination as an integrated circuit (IC). Embodiments may also contain a conductive contact-making element 1018.

Processor 1008 may be any central processing unit, microprocessor, micro-controller, computational device or circuit known in the art.

Read only memory 1010 is embedded with an operating system. Non-volatile programmable memory 1014 is configured to be an application memory device, and may store information such as the primary account number and/or current balance information. Examples of non-volatile programmable memory 1014 include, but not limited to: a magnetic stripe, flash. memory, Electrically Erasable Programmable Read-Only Memory (EEPROM), or any other non-volatile computer memory or storage known in the art.

Random access memory 1012 is any temporary memory storage medium element known in the art. Random access memory is usually (but does not have to be) volatile memory.

The processor 1008, the read only memory 1010, the random access memory 1012 and the non-volatile programmable memory 1014 may coupled to one another through an internal bus system. Data can be interchanged between the input/output unit 1016, the processor 1008 and the non-volatile programmable memory 1014. Furthermore, data can be interchanged between the processor 1008 and the non-volatile programmable memory 1014.

Additionally, in some embodiments, the input/output circuitry 1016 is further coupled to a conductive contact-making element 1018 being formed in a surface area of the plastic support 1002. In some embodiments, the conductive contact-making element 1018 may be replaced by a radio frequency (RF) transceiver 1018. Radio frequency embodiments may typically use any RF transceiver known in the art for use in a radio frequency identifier (RFID) application or commonly used in a "pay wave" or "contactless" payment card.

In yet other embodiments, a contactless RF transceiver may be embedded in plastic support 1002 in addition to the conductive contact-making element 1018.

The electrically conductive contact-making element 1018 contains area elements that are electrically decoupled from one another, and these are annotated VCC, GND, RST, VPP, CLK and I/O. VCC is the connection for a supply voltage, RST is the connection for a reset signal, CLK is the connection for a clock signal, GND is the ground connection, VPP is the connection for a programming voltage, and I/O forms a connection as a data input/data output. The connection RST is used for application of a start signal for communication. A clock for the smart card processor is supplied from the outside via the connection CLK, with the clock frequency according to the described exemplary embodiment being 7.5 MHz. The programming voltage which is applied to the connection VPP is usually a voltage higher than the supply voltage. Bi-directional data transmission takes place via the input/output connection I/O for the actual interchange of useful information with the smart card. Similar data exchange or transmission takes place in contactless embodiments.

Power supply 1020 may be any electrical power supply, including a battery, fuel cell, long-term capacitor or any other power storage known in the art. Power supply 1020 may be recharged by applying a direct current voltage. A voltage is applied to the payment card 1000 as the supply voltage VCC. Example supply voltages include 5 volts, 3.3 volts, or 1.7 volts.

Figure 2A:
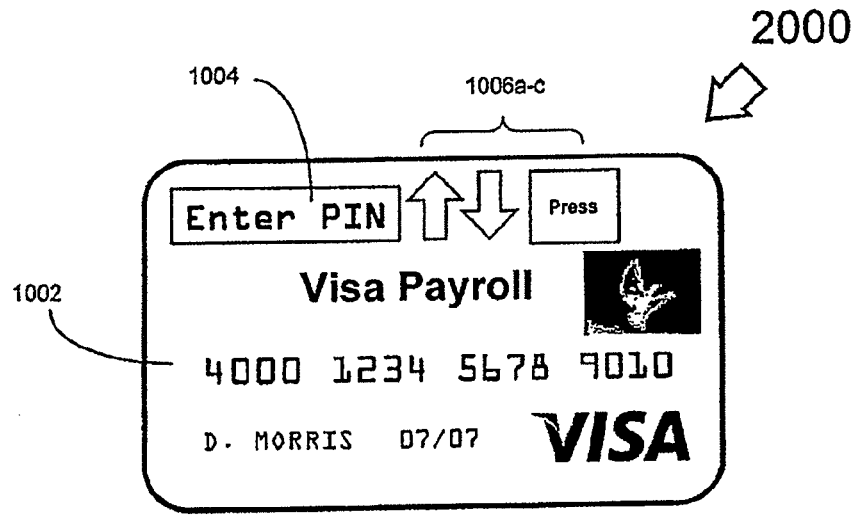
FIGS. 2A-B depict an embodiment of a reloadable prepaid payment card configured to display the current balance of the card.
Figure 2B:
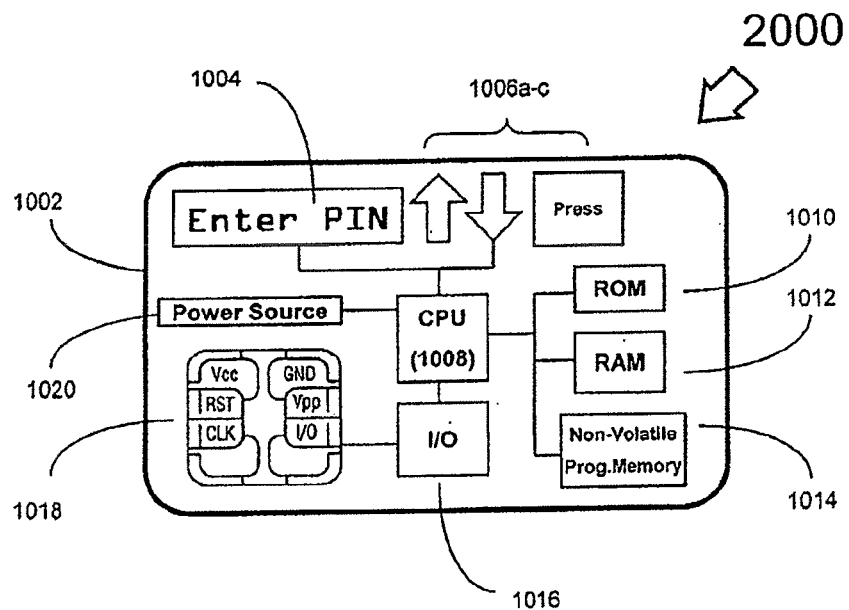

As shown in FIGS. 2A-B, constructed and operative in accordance with an embodiment of the present invention, a reloadable embodiment of a prepayment card 1000 is similar to the non-reloadable embodiment of FIGS. 1A-B, and may have multiple buttons 1006*a-c*. It is understood by those known in the art that any number of buttons 1006 may be implemented on a prepayment card, and that the choice of three buttons 1006 is for illustrative purposes only. Arrow buttons 1006*a-b* may be used for entering alpha-numeric information such as a personal identification number or alpha-numeric code. Some embodiments may implement buttons 1006 as part of a numeric pad or alpha-numeric keyboard, but available space on the card is a limitation.

Figure 3:
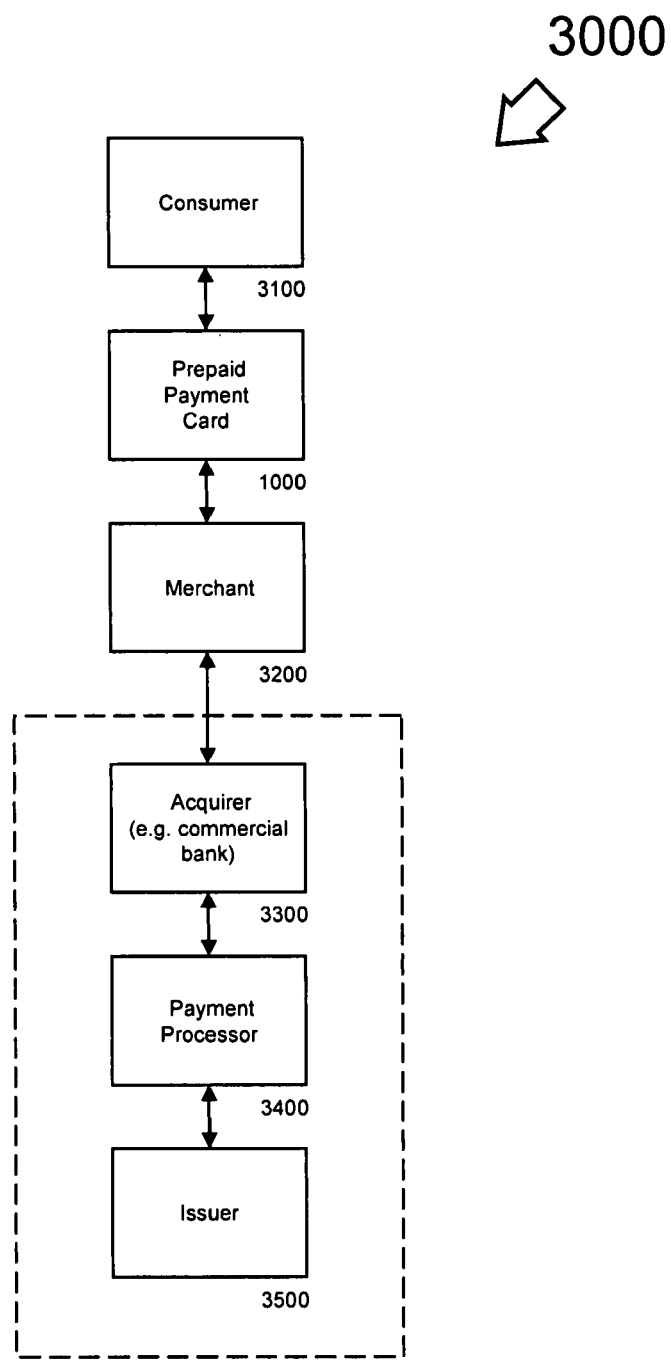
FIG. 3 is a block diagram of a system embodiment to support the display of a current balance on a prepaid payment card.

FIG. 3 illustrates a system to support the display of a real-time prepaid payment card balance, constructed and operative in accordance with an embodiment of the present invention. A customer 3100 receives a prepaid payment card 1000. In some instances the card 1000 is purchased from an issuer 3500; in other instances the customer receives the card 1000 indirectly from the issuer 3500, as a gift or as the result of a promotion. When the customer 1000 uses the prepaid payment card 1000 at a merchant 3200 to pay for a product or service, the merchant 3200 contacts an acquirer 3000 (for example, a commercial bank) to determine whether there is sufficient funds on the card to pay for the transaction or a portion of the transaction. The acquirer 3300 forwards the details of the payment transaction to a payment processor 3400 for processing. Payment processor may be any payment network known in the art. In some instances, the payment processor 3400 determines whether the transaction should be allowed; in other instances, the payment processor 3400 queries the issuer 3500 to determine whether the prepayment card has enough funds to allow the transaction.

Figure 4:
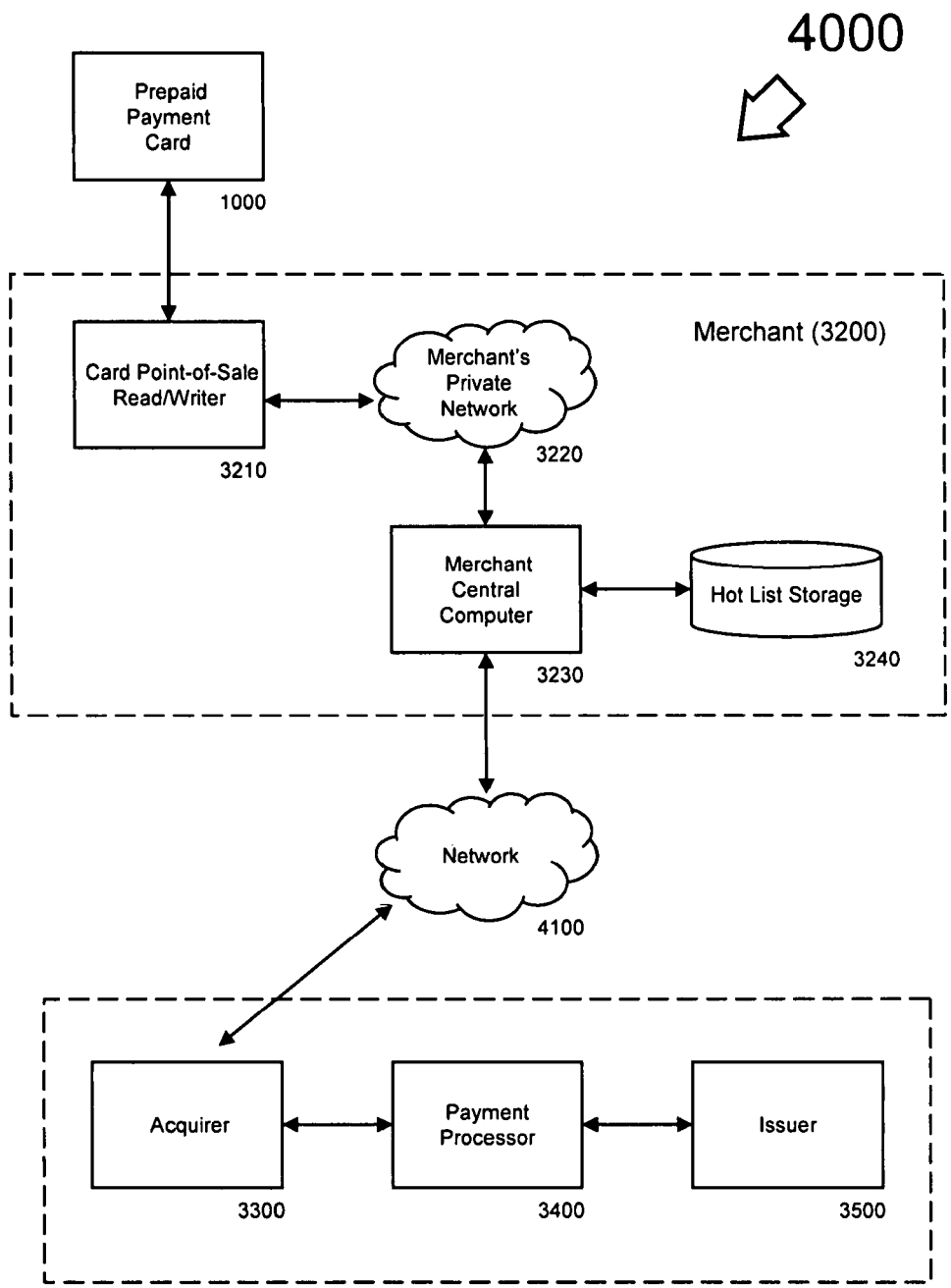
FIG. 4 is an expanded view of a merchant's system embodiment to support the display of the current balance on a prepaid payment card.

FIG. 4 depicts merchant 3200 in greater detail, where merchant 3200 includes a system to support the display of a real-time prepaid payment card balance, constructed and operative in accordance with an embodiment of the present invention. As shown, in FIG. 4, merchant 3200 comprises a card point-of-sale read/writer 3210 that communicated with a merchant central computer 3230 via the merchant's private network 3220. In some embodiments, merchant central computer 3230 may be coupled to hot list storage 3240.

Card point-of-sale read/writer 3210 is any device capable of reading a personal account number off a prepaid payment card 1000, and write card balance information to the prepaid payment card 1000.

Merchant central computer 3230 is a networked device capable of communicating transaction data with card point-of-sale read/writer 3210 and transmitting the transaction data over network 4100 to acquirer 3300.

Hot list storage 3240 may be any list, database, or memory structure containing either invalid or valid primary account numbers.

Operation of these prepayment card and system embodiments of the present, invention may be illustrated by example.

We now turn our attention to method or process embodiments. It is understood by those known in the art that instructions for such method embodiments may be stored on a non-volatile programmable memory 1014 and executed by a processor 1008.

Figure 8:
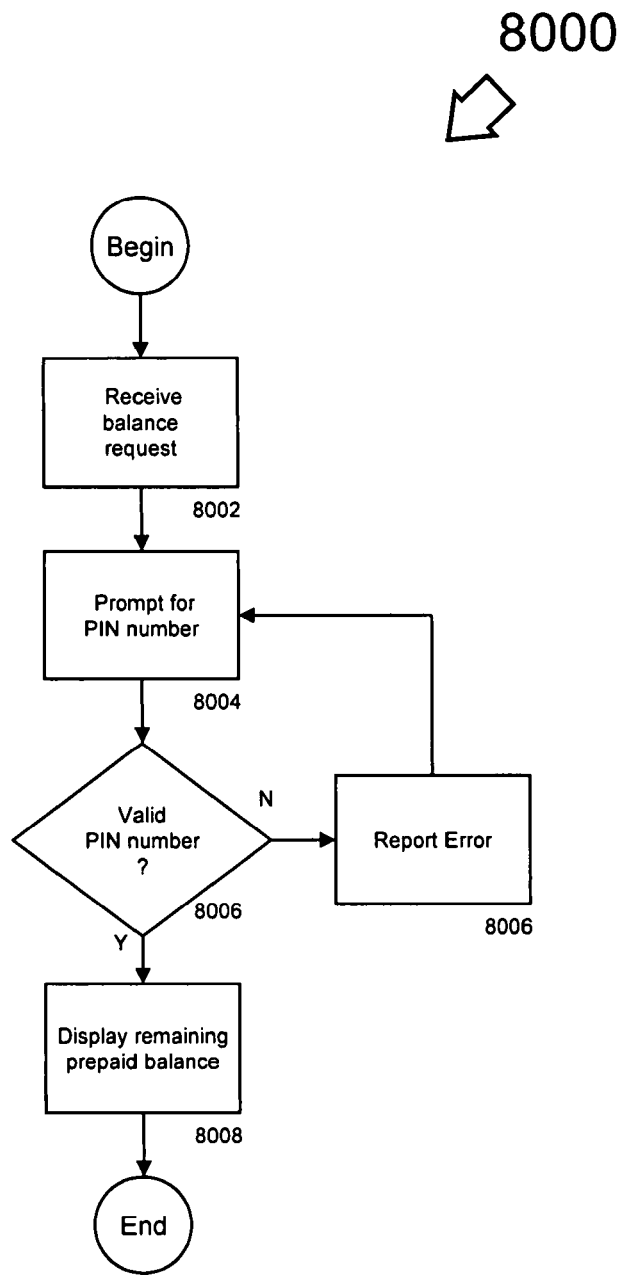
FIG. 8 illustrates a process embodiment to display the current balance of a prepaid payment card.

FIG. 8 illustrates a process embodiment to display the current balance of a prepaid payment card (1000 or 2000), constructed and operative in accordance with an embodiment of the present invention. When a user wants to know the balance of prepaid payment card (1000, 2000), the user requests the balance through pressing button 1006. The card receives the balance request, block 8002.

In card (2000) embodiments that utilize a personal identification number (PIN), display 1004 prompts the user for the PIN number, block 8004. The personal identification number may be stored in non-volatile programmable memory 1014 or in a magnetic stripe. At this point, the user may enter a PIN number using buttons 1006*a-c*.

In some embodiments, an error message is displayed when an invalid PIN number is entered, block 8006, and flow returns to block 8004.

Upon receipt of a valid PIN number as determined at decision block 8006, the display shows the remaining prepaid balance, block 8008.

In embodiments where a payment card 1000 does not use a PIN number, the remaining prepaid balance is displayed 8008 whenever the button 1006 is depressed.

Figure 5:
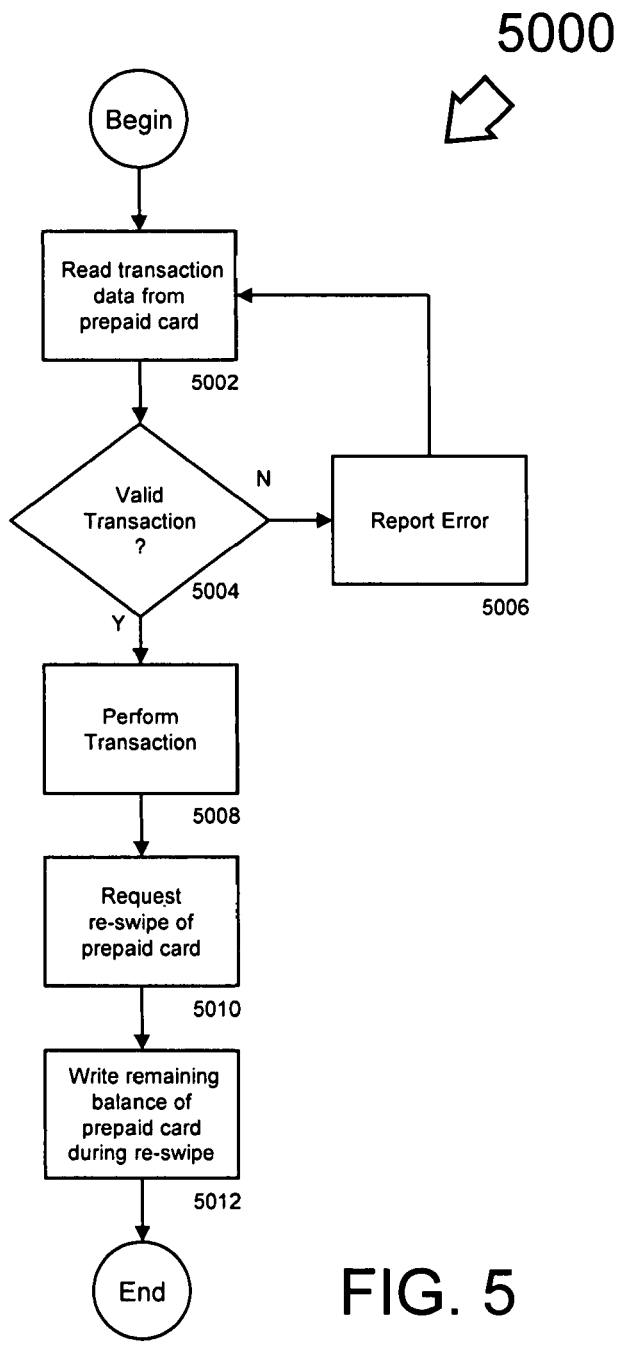
FIG. 5 is a flow chart of a card-writer process embodiment configured to store balance information on a prepaid payment card after a payment transaction.

Turning to FIG. 5 is a flow chart of a card-writer process embodiment configured to store balance information on a prepaid payment card after a payment transaction, constructed and operative in accordance with an embodiment of the present invention.

When a prepaid payment card (1000 or 2000) is presented for payment at a merchant 3200, the primary account number and other data may be read at a card point-of-sale read/writer 3210, block 5002. The card (1000 or 2000) may be presented in a variety of different methods, such as swiping the card (1000 or 2000) or via a contactless ("paywave") radio-frequency presentation, as are known in the art.

A payment card validation, as is known in the art, is performed using the data retrieved from the payment card (1000 or 2000). In some embodiments, merchant central computer 3230 consults with hot list storage 3240 to determine whether the transaction may be validated. In other embodiments, merchant central computer 3230 contacts acquirer 3300 to determine whether the transaction is valid. If the transaction is invalid as determined at decision block 5004, an error message is returned at block 5006. When the transaction is valid, flow continues at block 5008.

At block 5008, the payment transaction occurs.

At block 5010, the user is prompted to re-present the payment card (1000 or 2000). In card embodiments that use a magnetic strip, the presentation may be accomplished as a swipe of the card (1000 or 2000). During the card swipe, the remaining balance of the prepaid payment card (1000 or 2000) is written to the magnetic strip. The amount of the remaining balance may be received from issuer 3500 or payment processor 3400, or calculated by the merchant 3200 using information received from issuer 3500. In some embodiments, the card balance is written to track 3 of the magnetic strip. In other embodiments, the card balance may be written to a non-volatile programmable storage media 1014.

Figure 6:
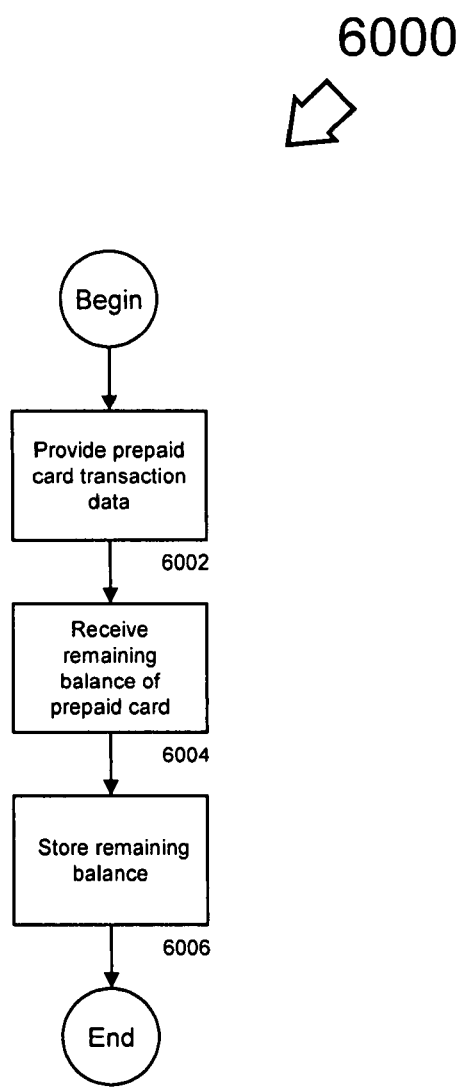
FIG. 6 illustrates a process embodiment that stores balance information on a prepaid payment card after a payment transaction.

FIG. 6 illustrates a process embodiment that stores balance information on a prepaid payment card after a payment transaction, constructed and operative in accordance with an embodiment of the present invention. As part of the payment transaction, primary account number and other information may be provided to merchant 3200, block 6002. The remaining balance of the prepaid payment card (1000 or 2000) is received from a card point-of-sale read/writer 3210, via the conductive contact-making element 1018 or an embedded radio-frequency antenna embedded within the card (1000 or 2000), at block 6004, and is written to a magnetic strip or non-volatile programmable storage memory 1014 at block 6006. In magnetic strip embodiments, the card balance may be written to track 3 or other tracks. In "smart card" embodiments, non-volatile programmable memory 1014 stores the card balance.

Figure 7:
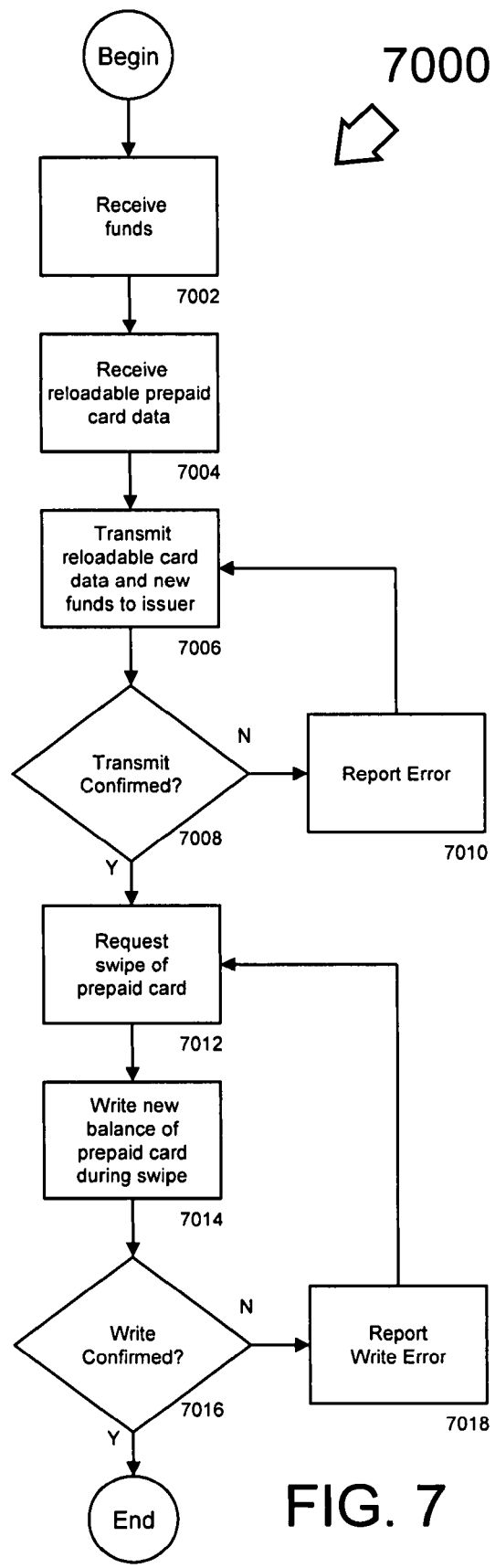
FIG. 7 is a flow chart of a card-writer process embodiment that stores balance information on a prepaid payment card after a fund reload.

At certain times, prepaid payment card 2000 users may want to add additional funds to their card 2000. In such instances, the balance of prepaid payment card 2000 needs to be updated to accurately reflect the total. FIG. 7 depicts a flow chart of a card-writer process 7000 embodiment that stores new balance information on a prepaid payment card 2000 after a fund reload, constructed and operative in accordance with an embodiment of the present invention. FIG. 7 assumes that the card reload is occurring at merchant 3200 in communication with issuer 3500; it is understood that the reload card may also occur at other locations. It is also understood that process 7000 may also be used during the activation of prepayment cards (1000, 2000) when such cards are initially purchased.

At first, merchant 3200 receives funds from consumer 3100, block 7002. The amount of the funds may vary, and may be limited by the issuer 3500. The transfer of funds may occur through a variety of different methods, including cash, or various electronic payment methods. The prepaid payment card 2000 is presented to a card point-of-sale read/writer 3210, and the primary account data 7004 is received, block 7004. The card data and new funds are transmitted to the issuer at block 7006.

If the transmission to the issuer 3500 is not confirmed, as determined by decision block 7008, an error is reported at block 7010, and flow returns to block 7006.

When the transmission to the issuer 3500 is successful, process 7000 continues at block 7012.

At block 7012, card point-of-sale read/writer 3210 requests the re-presentation of the card 2000. During the presentation, the new balance of the prepaid card is written to the card 2000. The amount of the new balance may be received as data from payment processor 3400, issuer 3500 or calculated by the merchant 3200 using information received from issuer 3500 or payment processor 3400. In card embodiments that use a magnetic strip, the presentation may be accomplished as a swipe of the card 2000. During the card swipe, the remaining balance of the prepaid payment card 2000 is written to the magnetic strip. In some embodiments, the card balance is written to track 3 of the magnetic strip. In other embodiments, the card balance may be written to a non-volatile programmable storage media 1014.

If the card balance write is not confirmed, as determined by decision block 7016, an error is reported at block 7018, and flow returns to block 7012.

When the write is successful, process 7000 ends.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A payment card comprising:
   a plastic body,
   a non-volatile programmable memory configured to store an account identifier associated with an account of the payment card and a current card balance after a transaction, wherein the current card balance is encoded on the non-volatile programmable memory after receiving current balance information from a point-of-sale (POS) device;
   an input-output module configured to provide the account identifier to the POS during a first presentation of the payment card to the POS, wherein the POS requests current balance information from an issuer of the payment card responsive to the first presentation using the account identifier, and the input-output module is further configured to receive the current balance from the POS during a second presentation of the payment card to the POS, wherein the first and second presentations occur sequentially during the transaction;
   a button configured to receive a request for the current card balance; and
   a display configured to show the current card balance responsive to the button receiving the request for the current card balance.

2. The payment card of claim 1 further comprising:
   a contactless element configured to transmit an account identifier to the POS device and configured to receive current balance information from the POS device.

3. The payment card of claim 2, wherein the current balance information includes the current card balance.

4. The payment card of claim 2, wherein the current balance information includes information from which the current card balance can be calculated.

5. The payment card of claim 1, wherein the current card balance is a previous card balance less a transaction amount associated with the transaction.

6. The payment card of claim 1, wherein the non-volatile programmable memory is a magnetic stripe on the prepaid payment card and the current card balance is encoded on the magnetic stripe.

7. The payment card of claim 6, wherein the current card balance is encoded on track 3 of the magnetic stripe on the prepaid payment card.

8. The payment card of claim 1, wherein the display is further configured to prompt the user for input of a personal identification number (PIN), wherein the PIN is stored in the non-volatile programmable memory on the payment card.

9. The payment card of claim 8 further comprising:
   a processor configured to determine whether the PIN is valid, wherein the current card balance is displayed only if the PIN is determined to be valid.

10. The payment card of claim 1, wherein the transaction is a funds load transaction.

11. A point of sale device comprising:
    a processor;
    an input/output (I/O) element coupled to the processor, the I/O element configured to read payment card data from a payment card during a first presentation of the payment card and configured to transmit data to the payment card during a second presentation of the payment card, wherein the first and second presentation occur sequentially during a transaction;
    a computer-readable medium comprising code that, when executed by the processor, cause the point of sale device (POS) to:
      read payment card data with the I/O element, wherein the POS requests current balance information from the payment network,
      transmit transaction data associated with a transaction, including a portion of the payment card data, to a payment network,
      receive a response from the payment network indicating whether the transaction is approved or denied,
      receive current balance information from the payment network, and
      transmit a current balance to the payment card with the I/O element during the second presentation of the payment card.

12. The point of sale device of claim 11, wherein the payment network comprises at least one of an issuer, an acquirer, or a payment processor.

13. The point of sale device of claim 11, wherein the I/O element comprises a radio frequency (RF) transceiver.

14. The point of sale device of claim 11, wherein the I/O element comprises a contact-making element.

15. The point of sale device of claim 11, wherein the I/O element comprises a magnetic stripe reader/writer.

16. A system comprising:
    a payment network configured to receive transaction data associated with a transaction; and
    a point of sale (POS) device, wherein the POS is configured to:
      read payment card data from a payment card during a first presentation of the payment card to the POS;
      transmit transaction data associated with a transaction, including a portion of the payment card data, to the payment network;
      receive a response from the payment network indicating whether the transaction is approved or denied,
      receive current balance information from the payment network, wherein the current balance can be determined from the current balance information, and
      transmit the current balance information or current balance to the payment card during a second presentation of the payment card to the POS, wherein the first and second presentation occur sequentially during the transaction.

17. The system of claim 16, wherein the payment network comprises at least one of an issuer, an acquirer, or a payment processor.

18. The system of claim 16, wherein the payment card comprises:
    a plastic body,
    a non-volatile programmable memory configured to store the current card balance after the transaction, wherein the current card balance is encoded on the non-volatile programmable memory after the current balance information or the current balance is received from the POS device,
    a button configured to receive a request for the current card balance, and
    a display configured to show the current card balance responsive to the button receiving the request for the current card balance.

19. The system of claim 18, wherein the POS is further configured to determine whether a successful transmission of the current balance information or current balance to the payment card occurred.

20. The system of claim 16, wherein the payment card is a prepaid payment card and the transaction is a reload transaction that adds funds to the prepaid payment card.

* * * * *